May 28, 1935.  W. J. WOODS  2,002,875
METHOD OF AND APPARATUS FOR DRAWING GLASS
Filed May 24, 1933
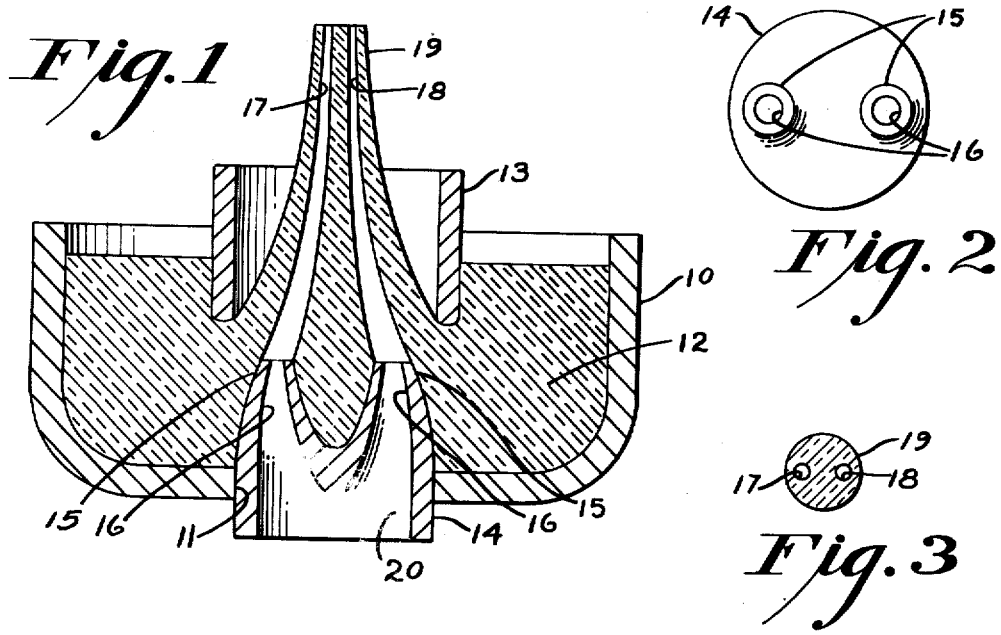
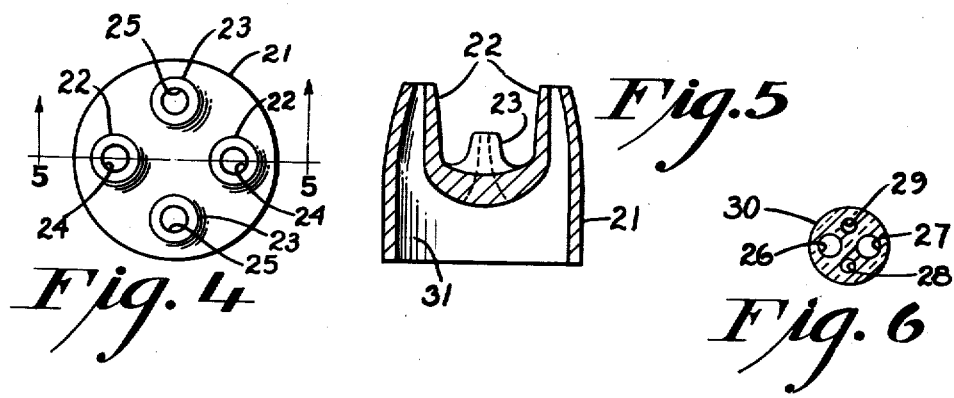
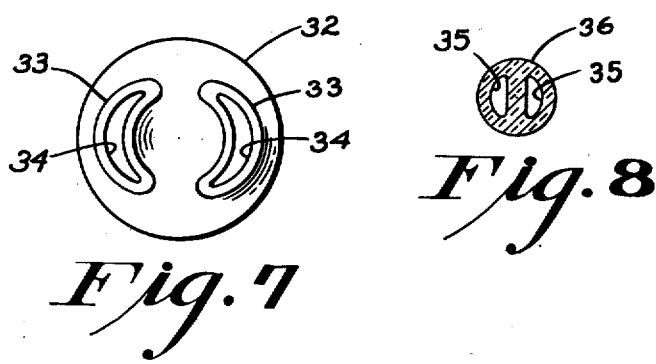
INVENTOR.
WILLIAM J. WOODS
BY
ATTORNEYS.

Patented May 28, 1935

2,002,875

UNITED STATES PATENT OFFICE 2,002,875

METHOD OF AND APPARATUS FOR DRAWING GLASS

William J. Woods, Corning, N. Y., assignor to Corning Glass Works, Corning, N. Y., a corporation of New York Application May 24, 1933, Serial No. 672,704

5 Claims. (Cl. 49—17.1)

This invention relates to improvements in drawing glass and more particularly to a method of and means for producing multiple bore tubing.

The object of the invention is the rapid and accurate production of glass tubing having a plurality of parallel longitudinal bores or passages wholly separated from one another throughout their entire length by webs.

Another object is to control the cross-sectional shape of the bore or bores formed in drawn glass tubing.

The above and other objects may be attained by employing my invention which embodies among its features drawing glass upwardly through a conditioning and shaping sleeve from around a cooled hollow body which is submerged below the surface of a pool of molten glass and which body is provided with a plurality of upwardly extending bore-forming nipples.

Other features embody providing the body with nipples of differing heights so that bores of different sizes may be produced simultaneously in the same piece of tubing.

Still other features embody so shaping the nipples and the air-admitting openings in them, that bores of predetermined shape may be formed in the tube during the drawing process.

In the drawing:

Fig. 1 is a sectional view through a tube drawing pot embodying one form of my invention;

Fig. 2 is a plan view of the hollow body employed in Fig. 1;

Fig. 3 is a transverse sectional view through a piece of tubing drawn from equipment constructed in accordance with Fig. 1;

Fig. 4 is a plan view of a modified form of hollow body;

Fig. 5 is a sectional view through the body illustrated in Fig. 4;

Fig. 6 is a transverse sectional view through a piece of tubing drawn from equipment constructed in accordance with my invention using the hollow body illustrated in Fig. 4;

Fig. 7 is a plan view of a further modified form of hollow body; and

Fig. 8 is a transverse sectional view through a piece of tubing drawn from equipment constructed in accordance with my invention and using the body illustrated in Fig. 7.

Referring to the drawing in detail, a drawing pot 10 is mounted in a suitable heating furnace such as is illustrated in Patent No. 1,829,429 issued to me on the 27th day of October, 1931 and supported on the furnace above the pot 10 is a tractor such as is illustrated in the above-mentioned patent. As shown in Fig. 1, the bottom of the drawing pot 10 is formed with a relatively large opening 11 and supported in axial alignment with this opening in such a manner that its lower edge is below the upper surface of the glass 12 contained within the pot 10 is a conditioning and shaping sleeve 13, through which the molten glass is drawn.

Fitted within the opening 11 and extending upwardly into the drawing pot is a hollow body 14 which as shown in Fig. 1, is formed with a pair of spaced upwardly extending nipples 15 of equal height. Each of these nipples is formed with a passage 16 for admitting air into the glass to form the bores 17 and 18 in the tubing 19 as it is being drawn upwardly through the conditioning and shaping sleeve 13. As shown the passages 16 merge at their lower ends into a common chamber 20 formed in the lower end of the body 14, which chamber is wholly open at its lower end to the atmosphere. Air may be blown into the open end of the chamber 20 as shown in the patent above identified but under ordinary conditions this is not necessary as there is sufficient surface radiation from the body 14 to cause the walls of the bores 17 and 18 to partially set sufficiently to maintain the bores open.

In the modification illustrated in Fig. 4 I show a hollow body 21 which like the body 14 is fitted in the opening 11 formed in the bottom of the drawing pot 10. This body 21 is provided with a pair of upwardly extending nipples 22 of equal height and a similar pair of upwardly extending nipples 23 of lesser height than the nipples 22. Like the nipples 15, the nipples 22 and 23 are provided with air passages 24 and 25 respectively, which admit air into the glass and form the bores 26, 27, 28 and 29 in the tubing 30 as it is being drawn. As shown the passages 24 and 25 all merge at their lower ends into a common chamber 31 which, like the chamber 20, opens at its lower end to the atmosphere. By reason of the fact that the nipples 23 are of lesser height than the nipples 22, the bores 28 and 29 in the finished tubing will be of lesser diameter than the bores 26 and 27. Thus it will be seen that the relative diameter of the bores in the finished tubing may be varied by altering the height of the nipples and the lower the nipples below the surface of the glass, the smaller the bores will be.

In some instances it is desirable that bores other than those having a circular cross-section be formed in the tubing and I have found that the shape of the bores may be controlled by the shape of the nipples and the passages through which the bore-forming air is admitted to the glass. In Fig. 7 I have illustrated one example of my invention in which the cross-sectional shape of the bore is other than circular. In this modification I insert in the opening 11 of the drawing pot 10 a hollow body 32 which, like those previously described, is formed with upwardly extending nipples 33 from around which the molten glass is drawn upwardly through the conditioning and shaping sleeve 13. As shown in Fig. 7, the nipples 33 are substantially crescent-shaped in cross section and are provided with air passages 34 which likewise are substantially crescent-shaped in cross-section. Like the hollow bodies previously described the passages 34 open to the atmosphere at their lower ends so that bore forming air may freely enter them or air under pressure may be blown into them, to form the bores 35 in the tubing 36 (Fig. 8). Due to the surface tension of the molten glass, the bores 35 will not follow the exact shape initially imparted to them by the inflowing air but the concave sides of the crescents will tend to flatten so that by the time the tube has completely set, the bores will assume a cross-section substantially corresponding to the general shape of a half moon as illustrated in Fig. 8. Due to the tendency of the glass to assume a circular cross-section the junction between the semi-circular walls and the flattened walls will form rounded corners. Moreover, it is practically impossible to attain sharp corners between adjoining surfaces and hence allowance for such deformation must be made in the passages 34 in the nipples 33 through which the bore-forming air enters the tubing.

In operation, a bait is let into the pot 10 through the conditioning and shaping sleeve 13 so that it contacts with the upper surface of the glass 12 which adheres to it so that when the bait is raised by the tractor the glass will follow. The withdrawal of the glass through the sleeve 13 causes additional glass to flow in around the hollow body 14 and surround the nipples 15 so that as the draw takes place the spaces between the nipples are being continually supplied with fresh glass. As the drawn glass moves upwardly under the influence of the tractor, air enters it through the passages 16 and forms the bores 17 and 18 in the finished tubing. Obviously, a similar action takes place whether the hollow bodies 21 or 32 are employed.

While in the foregoing there has been shown and described the preferred embodiment of my invention, it is to be understood that minor changes in the details of construction, combination and arrangement of parts may be resorted to without departing from the spirit and scope of the invention as claimed.

What is claimed is:

1. The method of making multiple bore tubing which includes drawing glass upwardly from around a hollow body submerged in a pool of molten glass and admitting bore forming air at different levels into the glass through passages in the body.

2. In a glass drawing apparatus, a submerged hollow body from around which glass is drawn upwardly and spaced upwardly extending nipples on said body, said nipples having air admitting passages therein.

3. In a glass drawing apparatus, a submerged hollow body from around which glass is drawn upwardly, an upwardly extending nipple on the body having an air admitting passage therein, and a second upwardly extending nipple on the body also having an air admitting passage therein, the latter nipple being of less height than the first-mentioned nipple.

4. In a glass drawing apparatus, a submerged hollow body from around which glass is drawn upwardly through a conditioning and shaping sleeve, and spaced upwardly extending nipples on said body, said nipples having air-admitting passages therein.

5. In a glass drawing apparatus, a submerged hollow body from around which glass is drawn upwardly through a conditioning and shaping sleeve, an upwardly extending nipple on the body having an air admitting passage therein, and a second upwardly extending nipple on the body also having an air admitting passage therein, the latter nipple being of less height than the first-mentioned nipple.

WILLIAM J. WOODS.